United States Patent [19]

Lamy

[11] 4,056,944
[45] Nov. 8, 1977

[54] PROCESS AND DEVICE FOR LAYING SUBMARINE PIPELINES

[75] Inventor: Jacques Edouard Lamy, Fontenay-aux-Roses, France

[73] Assignee: C. G. Doris (Compagnie Generale pour les Developpements Operationnels des Richesses Sous-marines), Paris, France

[21] Appl. No.: 685,738

[22] Filed: May 13, 1976

[30] Foreign Application Priority Data

Oct. 15, 1975 France ............................... 75.15160

[51] Int. Cl.² ............................................. F16L 1/00
[52] U.S. Cl. ...................................... 61/107; 61/110; 61/111; 61/112; 114/253
[58] Field of Search ................. 61/113, 112, 107, 105, 61/110, 111; 254/173; 114/244, 245, 253

[56] References Cited

U.S. PATENT DOCUMENTS 3,849,997  11/1974  Gower ................................... 61/113

FOREIGN PATENT DOCUMENTS 1,222,669  1/1960  France ................................... 61/112
647,355  10/1962  Italy ....................................... 61/113

Primary Examiner—Jacob Shapiro
Attorney, Agent, or Firm—Laurence R. Brown

[57] ABSTRACT

For laying a submarine pipeline, hauling of the same is exerted by means of a force distribution cable which extends over the full length of the submerged part of the pipeline and which is attached to it by hangers, preferably in conjunction with heavy chains acting as guide ropes and anchoring blocks.

17 Claims, 24 Drawing Figures

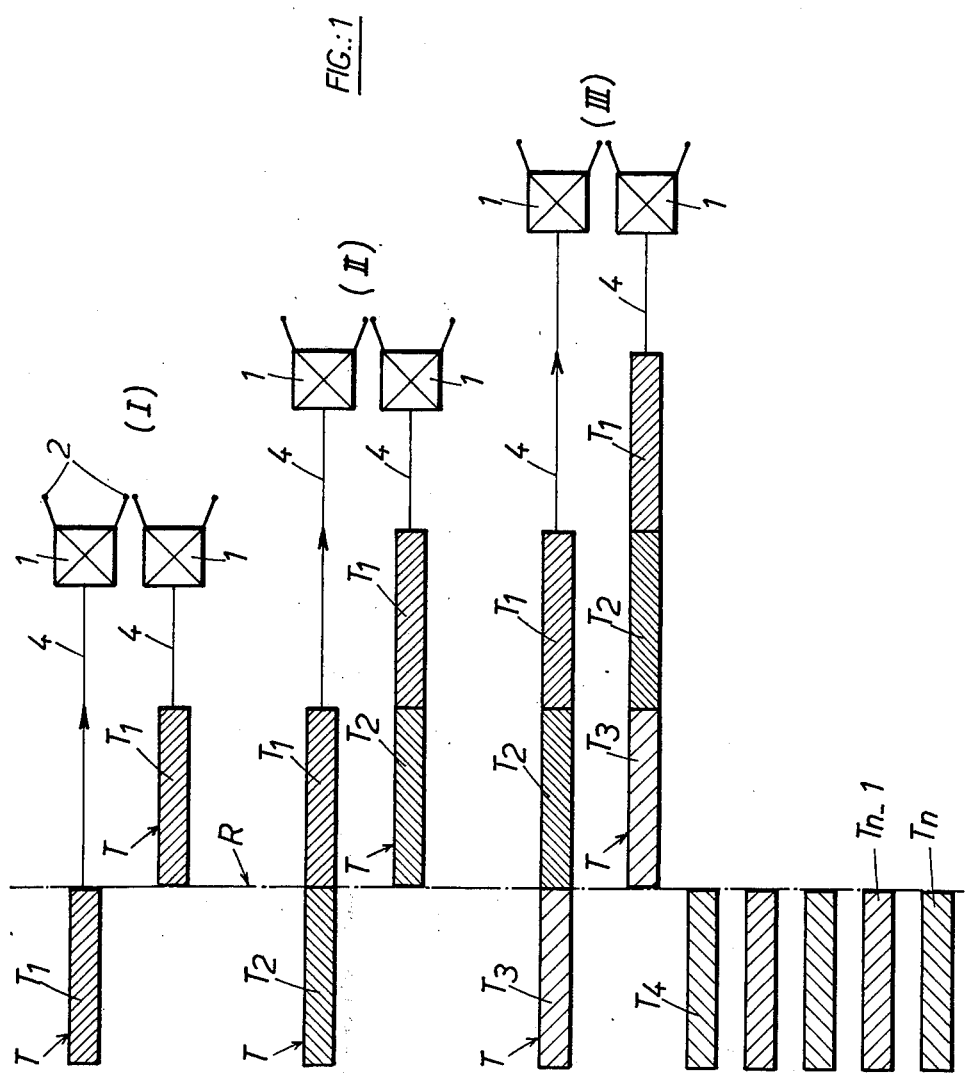

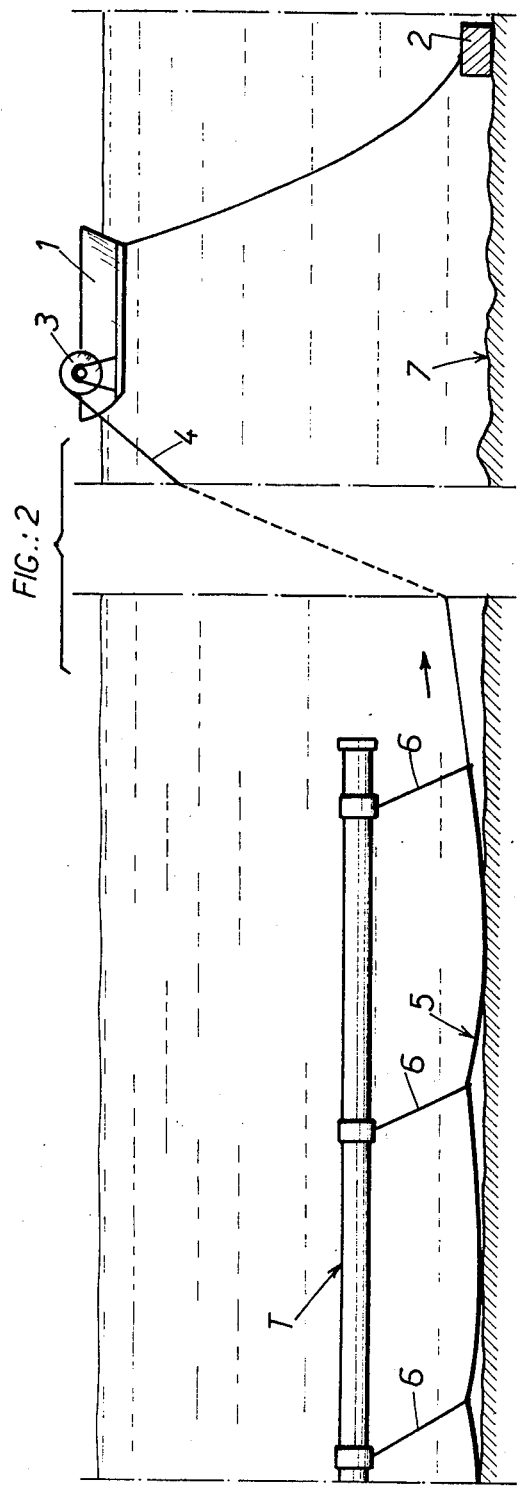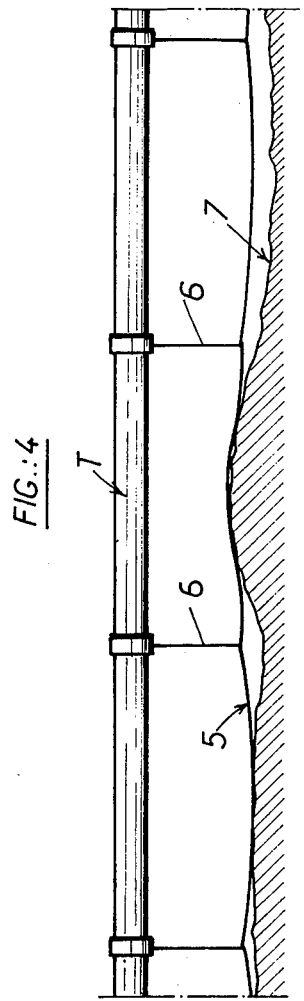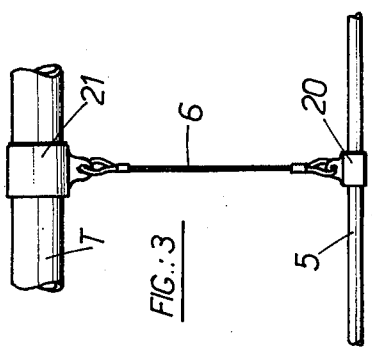

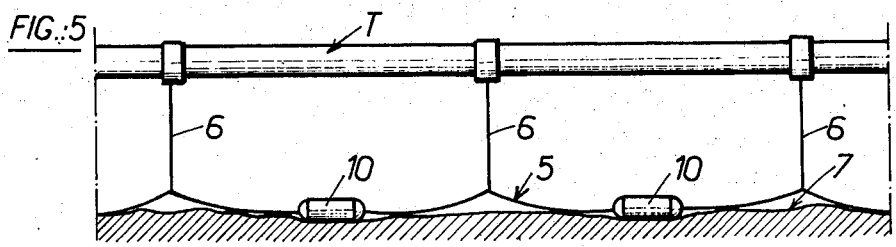
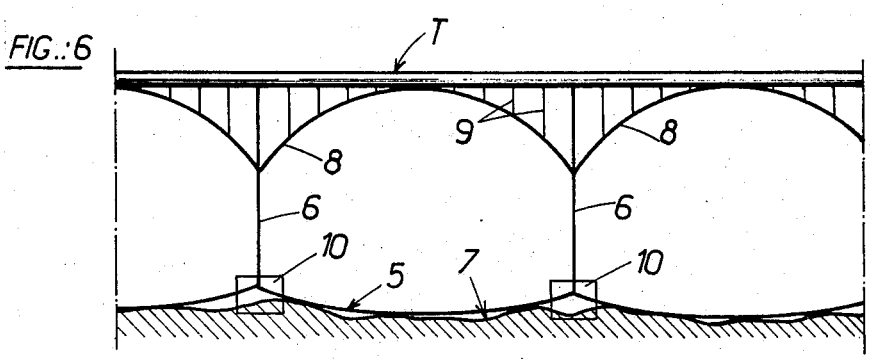
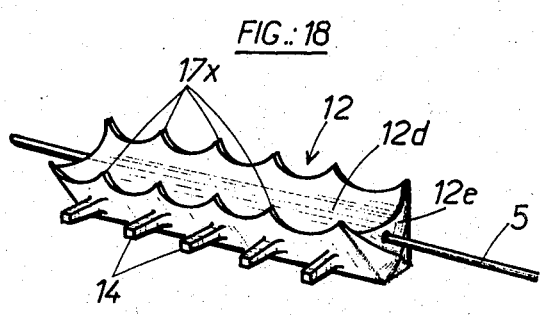
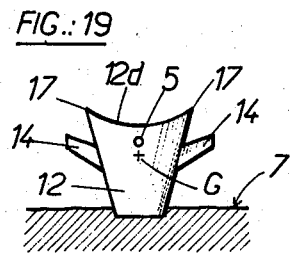
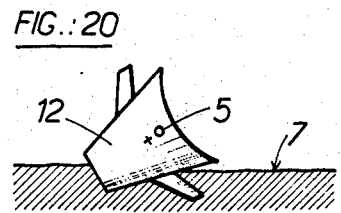
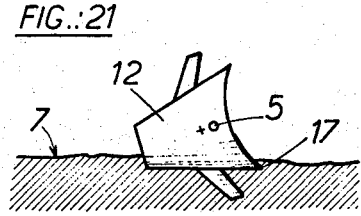

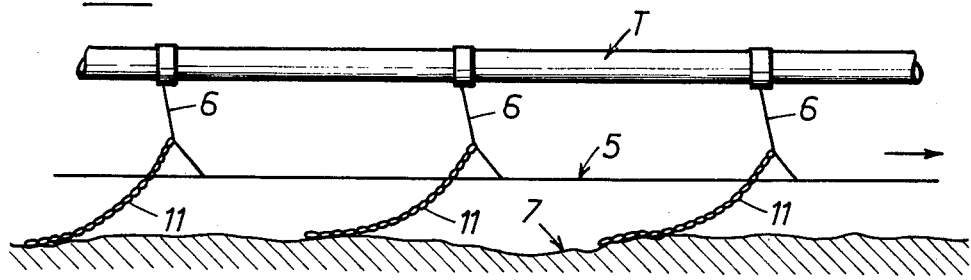
FIG.:7
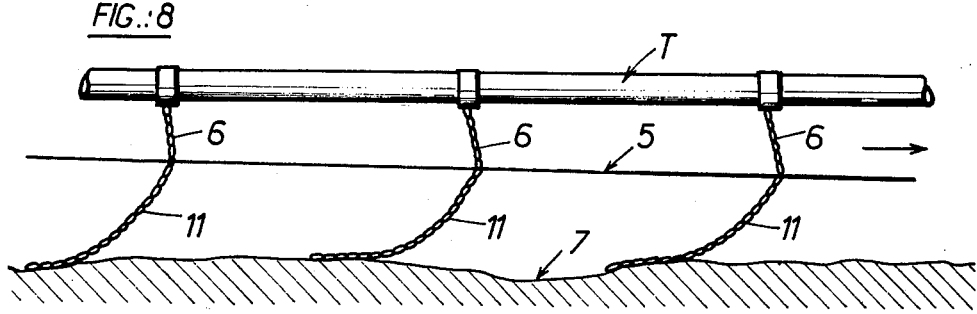
FIG.:8
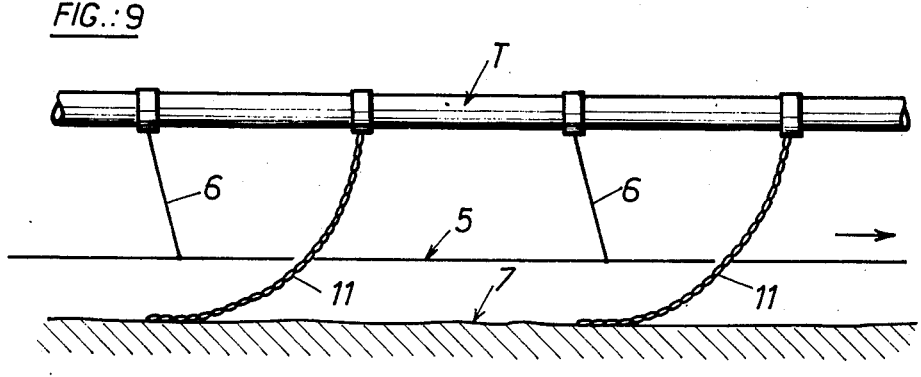
FIG.:9

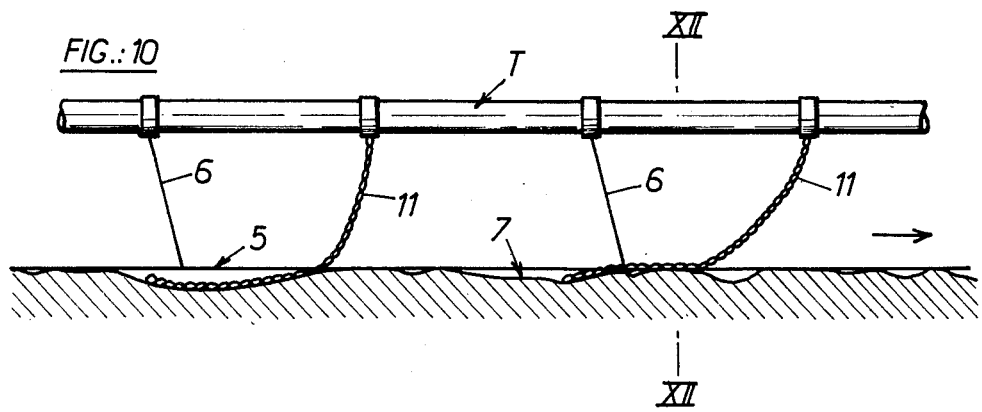
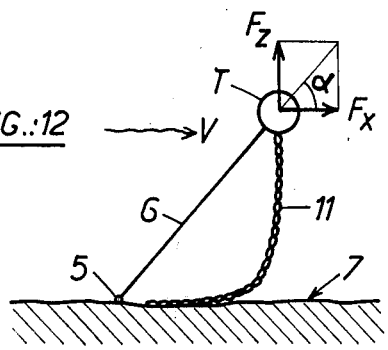
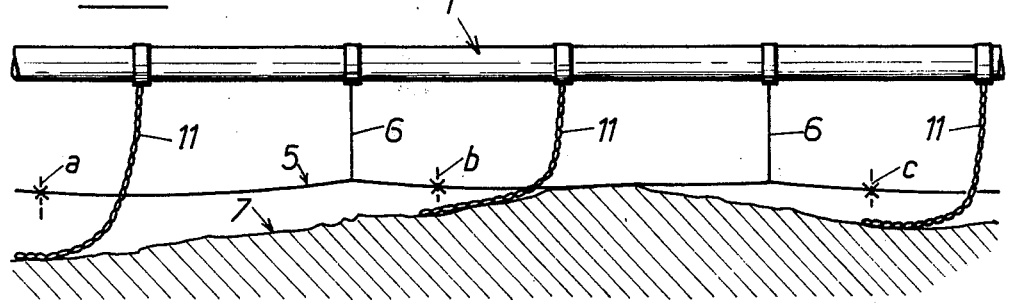

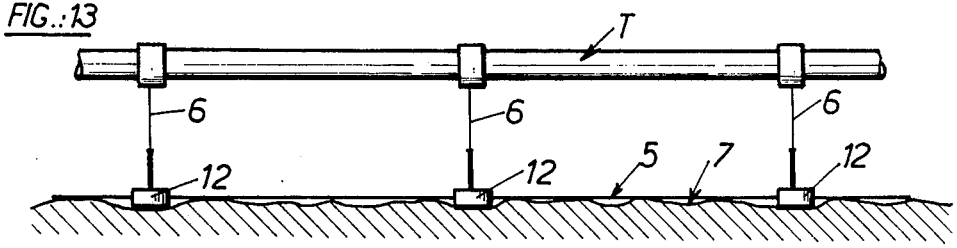
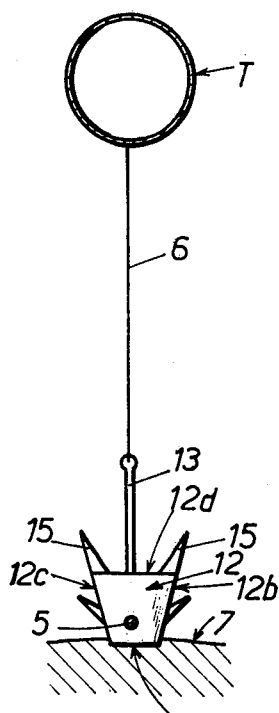
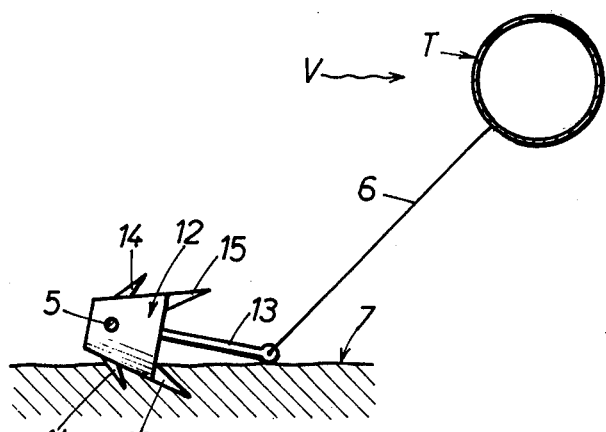
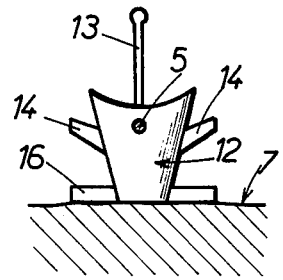
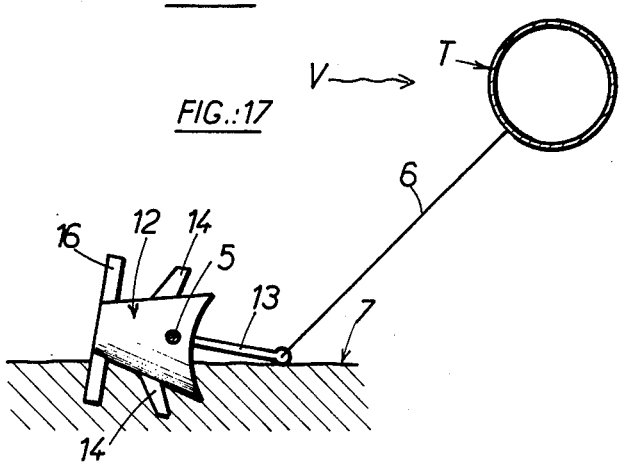

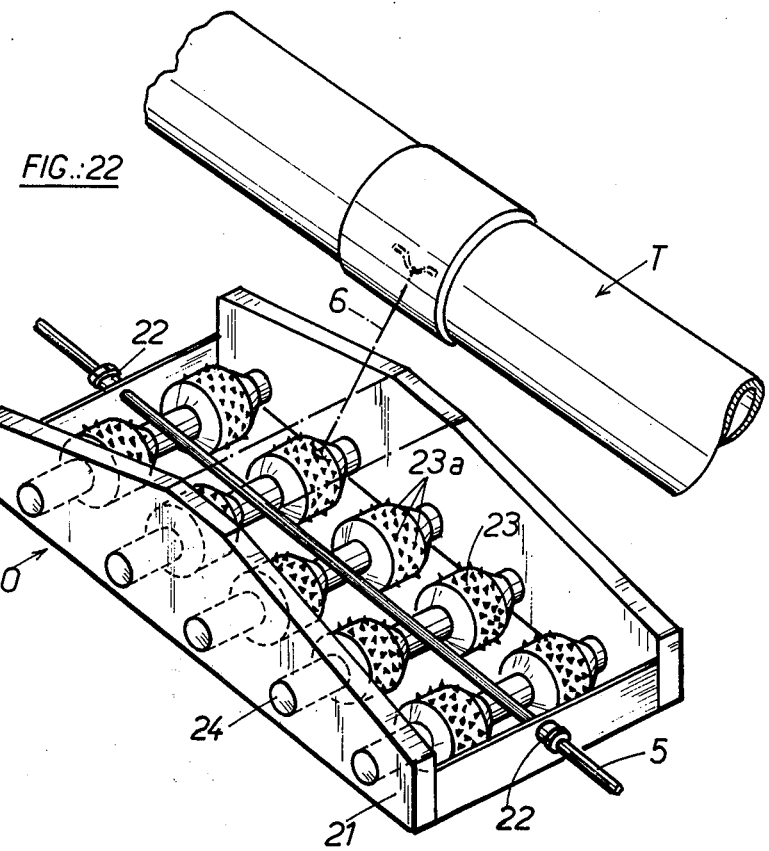
FIG.:22
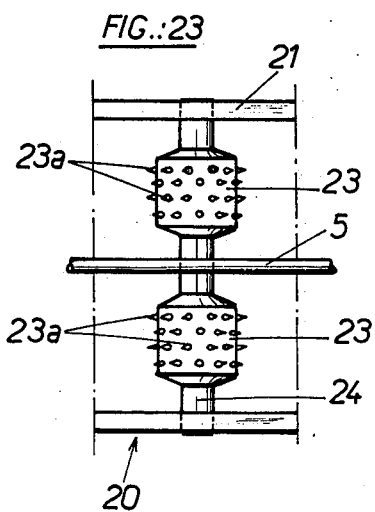
FIG.:23
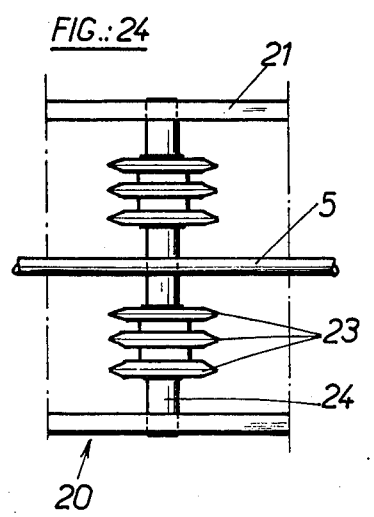
FIG.:24

PROCESS AND DEVICE FOR LAYING SUBMARINE PIPELINES

The present invention relates to the laying of submerged pipelines such as submarine pipelines, which are provided for instance for transporting liquid or gazeous hydrocarbons.

This invention is an improvement in a known process for laying submarine pipelines, which consists in hauling from the shore seawards a part of a pipeline of a gradually increasing length; this part is made of a series of sections which are successively added together at the rear end, still on the strand, of the already submerged pipeline length.

Each section is itself obtained by the assembly of a rather large number of unitary tubes of short length (for example of the order of 12 or 24 meters) which are welded end to end together. Such a section may have then an appreciable length (of the order of 1 km or even more) without any other limit than the availability of a sufficient space for prefabricating and storing pipelines in the vicinity of the shore. The sections are prefabricated ashore, for instance during winter, when bad weather does not allow a working at sea and they are launched when meteorological conditions are propitious.

For the laying of pipelines, each new section is welded to the rear end of the already submerged pipeline part which still rests on the shore. The assembly made of this part and the new section is then hauled seawards over a distance, which is equal to that of a section, by means of hauling contrivances carried by floating devices. Hauling is then suspended, the following section is welded and this operation is repeated as many times as sections are to be added and laid.

With respect to another process for laying submarine pipelines - which consists in submerging from the water surface, by means of a floating device which is specially arranged, pipeline sections assembled on this floating device — the above-mentioned hauling process has in particular the following advantages:

the pipeline is protected over its full length, during all the laying operations, against storms and cross sea;
the pipeline is not subjected to distortions difficult to be controlled such as those which occur in the course of immersion during the aforesaid process;
the critical phases, which include the execution and the checking of all the welds, are carried out ashore in much easier conditions than afloat;
the number of welds to execute and check during the laying proper of the pipeline is quite small by reason of the great length of the prefabricated sections. Thus this laying proceeds in a very short time.

There is however a problem which is to be faced in the hauling process for laying submarine pipelines of a great length which have to be submerged in places where cross currents predominate.

In order to prevent a submarine pipeline from drifting under the action of a cross current it is weighted with known means in such manner that the pipeline will rest on the sea bed with such a weight that the resulting friction force is great enough for resisting the current. As an alternative, the pipeline will float under water and it may be arranged that there are only weighting anti-drift elements, attached to the pipeline, which are frictionally engaged with the sea-bed.

A drawback thereof results from the considerable increase of the hauling force to be applied for laying the pipeline, which creates in the latter very high tensile stresses.

Because of such stresses the manufacturer is constrained to take particular precautions and avoid for instance the use of traditional unitary tubes of the "rolled-welded" type which show heterogeneous mechanical properties (owing to the presence of a continuous seam along a generatrix) with the possibility of failures. Instead it is necessary to use seamless tubes which are more costly than the ordinary tubes of the "rolled-welded" type and which possess greater dimensional tolerances, so that the supplying of the yard becomes complicated. Besides, said tubes have to be made of a special steel of a better quality than the ordinary steels for pipelines, which makes them more costly (for this reason also) and moreover it is more difficult to weld them together than is the case with the ordinary steel tubes.

The present invention has for its object to eliminate at least partly the difficulties just mentioned.

In its broadest definition, the process according to the invention consists in distributing the total traction force, which is necessary for advancing the pipeline part to be hauled, by means of a force distribution cable which extends over the full length of this pipeline part and which is attached to the latter at a plurality of points spaced along said pipeline part.

In this way the tensile force applied to the pipeline at every attachment point of the distribution cable is substantially equal to the quotient of the total traction force transmitted by the cable, divided by the number of attachment points.

As the tensile stresses in the pipeline are reduced by the same ratio, the much more economical use of traditional unitary tubes (of "rolled-welded" type, in ordinary steel) may still be contemplated, even for establishing long and heavily weighted, submarine pipelines.

The present invention also includes a device for putting the above mentioned process into practice, which may be used for laying a pipeline which has in itself or in association with floating means a positive buoyancy. This device comprises according to the invention a force distribution cable which extends under the pipeline part to be hauled all along the latter and a plurality of hangers, spaced along said pipeline part, by means of which this pipeline part and the distribution cable are interconnected, the overall system "pipeline-cable-hangers" having in itself or in association with weighting means a slightly negative buoyancy.

These weighting elements may comprise weighty elements, which are fixed at places to the distribution cable, or also guideropes, such as heavy chains, which are fixed to the pipeline or the hangers or partially confounded with the latter, each of them dragging partly on the seabed.

According to a preferred embodiment, slackening means which drag on the bed (or bottom of the body of water) are fixed at places to the distributing cable and arranged for opposing by friction on the bed a relatively weak resistance to the advance of this cable by pulling it in its longitudinal direction and a much higher resistance to a drift of the cable — and then of the pipeline — in its transverse direction. Preferably said slackening means are also connected to the pipeline through the hangers of the distributing cable.

The description which now follows, in relation to the appended drawing given by way of non-limitative example, will indicate how the invention may be put into effect, the features contained both in the drawing and in the text forming, self-obviously, part of the invention.

FIG. 1 is an illustrative diagram for explaining the principle of the laying of a submarine pipeline by hauling.

FIG. 2 is a schematic, longitudinal elevation view for explaining the distribution of the traction forces by means of a distributing cable which is connected to the pipeline with the intermediary of hangers.

FIG. 3 is a schematic view showing the way a hanger is attached to a pipeline and a distribution cable.

FIG. 4 is a view similar to FIG. 3, showing the position of the distribution cable on an irregular bottom ground.

FIGS. 5 and 6 are schematic, longitudinal elevation views, showing the weighting of the pipeline by means of weighty elements fixed to the distribution cable, while FIG. 6 moreover shows inverted catenary systems which complete the hangers.

FIGS. 7 to 11 are schematic, longitudinal elevation views which show the weighting of the pipeline by means of guideropes.

FIG. 12 is a schematic view in the form of a cross-section, taken along XII—XII, of the weighted pipeline shown in FIG. 10.

FIG. 13 is a schematic, longitudinal elevation view for illustrating the pipeline fitted with anti-drift slackening elements.

FIGS. 14 and 15 are schematic, cross-section views, in two working positions, of an anchoring block which is used as anti-drift, slackening element.

FIGS. 16 and 17 are similar to FIGS. 14 and 15 and show a modification of the embodiment of the anchoring block.

FIG. 18 is a schematic, perspective view, showing another possible embodiment of the anchoring block.

FIGS. 19 to 21 are schematic, cross-section views, illustrating several working positions of the anchoring block shown on FIG. 18.

FIG. 22 is a schematic, perspective view of a traveller which acts as an antidrift slackening element.

FIG. 23 is a partial plane view of the traveller shown on FIG. 22.

FIG. 24 is similar to FIG. 23 for illustrating a modification of embodiment of the traveller.

In all the figures the reference letter T designates the pipeline section in the process of being laid by hauling. This pipeline has itself or in association with floating means (not shown) a positive buoyancy. To this end spaced or continuous (extending over all the pipeline length) floats are used, which are filled with a gaseous or liquid fluid, having a specific weight less than water (atmospheric or pressurized air, hydrocarbon, ammoniac or liquid carbonic dioxide, fluidized compound made of a suspension of plastic microballs in water, etc.). Said floats may be releasable or filled with water at the end of the operations for laying the pipeline. The floating means are associated with weighting means that will be described further on.

The pipeline T may comprise in fact either one single useful tube or a system of useful, parallel tubes, integral with each other.

In FIG. 1 are schematically illustrated several successive phases for laying in position a submarine pipeline by the hauling process, when starting from an initial shore R.

The pipeline is formed with sections $T_1$, $T_2$, $T_3$ ... $T_{n-1}$, $T_n$; each of them may be made of a rather great number of unitary short tubes (for instance 12 or 24 m. long) which are welded together end to end. The sections, having an eventual length of 1 klm. or even more, are prefabricated and stored ashore in the vicinity of the shore R.

Laying of the pipeline is obtained by means of a floating device 1, which is anchored in the office by means of dead weights 2 and equipped with a hauling device such as a winch 3 (See FIG. 2) around which a pulling cable 4 is wound.

When the floating device 1 is in a first working position (I) remote from the shore R, the cable 4 is attached to the head section $T_1$ and by means of the hauling device 3 a traction is exerted on this cable for advancing seawards the section $T_1$ weighted in an appropriate manner.

As long as it is still on the land, the section $T_1$ is carried on lorries or glides over tyres. When the rear end of this section arrives at the border line of the shore, hauling is suspended. The floating device 1, freed from its anchors, is removed further away from the shore (the cable 4 being allowed to unwind) over a distance equal to the length of a section, so that it comes to its second working position (II). During this time the front end of the second section $T_2$ is welded to the rear end of the head section $T_2$.

The floating device being in its position II, the pipeline part T, made of the first two sections $T_1$ and $T_2$ weighted in an appropriate manner is hauled towards the open sea by means of the hauling device 3 as far as the rear end of section $T_2$ arrives to the border line of the shore. Hauling is then suspended anew; the floating device 1 is removed further away unto its new working position (III). The third section $T_3$ is welded to the first two ones and so forth until all sections are assembled and the head section $T_1$ has arrived at its destination, for instance to the shore opposite.

FIG. 2 illustrates the principle of the distribution of the pulling forces according to the invention.

An essential element for putting said principle into practice is a distribution cable 5 arranged in prolongation of the hauling cable 4, which extends over the full length of the pipeline T (with all the already welded sections) and which is attached to the latter at a plurality of points spaced all along this pipeline part.

The pipeline T being in a configuration of positive buoyancy, the distribution cable 5 is situated under this pipeline to which it is connected by a plurality of spaced hangers 6. This cable may be shaped as a metal cable comprising stranded or parallel wires, or a chain or a metal rod or bar having the necessary length, or a succession of metal rods or bars which are connected together by cable or chain parts. The hangers 6 may be made of metal cables or chains or preferably of plastic material. The hangers may be shorter or longer according to the height of the sheet of water. The interval between two successive hangers will depend from the buoyancy conferred to the pipeline, the bending strength of the pipeline and the eventual existence of cross currents. This interval is normally of the order of a few tens of meters, for example between 15 and 100 meters.

FIG. 3 shows by way of example a possible way for attaching a hanger 6 to the distribution cable 5 and the pipeline T in case the hanger is a cable. At every end the hanger forms a welded loop which is passed through an eye integral with a sleeve 20 welded to the distribution cable 5 or carries by a collar 21 that is welded to the pipeline T. As an alternative one could also use a catching system by means of hooks, in particular for hangers made of chains.

The system "pipeline T — distribution cable 5 — hangers 6" has itself or in association with weighting means (which will be described further on) a slightly negative buoyancy so that the pipeline floats under water. In the pipeline part which is still ashore (consisting of the last welded section) the cable 5 and the hangers 6 are momentarily laid against the pipeline and are released after entering the water preferably beyond a certain depth.

As it may be seen, the pulling force exerted by the hauling cable 4 is substantially supported by the distribution cable 5 which transmits every time but a small fraction of the force to the pipeline T. The stresses which result in the pipeline are thus extremely reduced.

In the example of FIG. 3, weighting is ensured by the weight of cable 5 and hangers 6. The latter are taut and the cable 5 lies with its central portion, between two successive hangers, on the bed 7.

The pipeline T, being subjected (because of its positive buoyancy) to an uplifting force, but being maintained by the hangers 6, behaves as a deck girder with inverted loads. If the buoyancy of the pipeline is great, the number of hangers is consequently increased so as to reduce the interval between two hangers. As an alternative it is possible to resort to catenary inverted systems including holding cables 8 so as to form a catenary curve and auxiliary hangers 9.

The distribution cable 5 and the hangers 6 are shown in a pulling configuration in FIG. 3 and in a rest configuration in FIG. 4. In the latter figure it is admitted that the surface of the seabed 7 is rather rugged. If the hangers 6 have all the same length the cable 5 will be raised in certain zones, which may produce "free spans" for pipeline T that will be larger than an ordinary interval between two successive hangers. Thus the pipeline will take an average position with respect to the profile of the seabed.

If necessary a supplemental weighting may be formed by means of weighty elements 10 which are fixed at places to the distribution cable 5, for instance between two hangers 6 or plumb with each hanger, as the FIGS. 5 and 6 show respectively. Such weighty elements may be executed in the form of steel or cement blocks through which the distribution cable passes; at the same time they may be used, as will be seen further on, as anti-drift elements for the pipeline.

FIGS. 7 to 11 illustrate other arrangements according to the invention. The weighting of the system "pipeline T — distribution cable 5 — hangers 6" is complemented with supple or articulate, relatively heavy links, such as hanging chains 11, disposed at places along the pipeline, which drag partly on the seabed and work like guideropes for balloons. Said guideropes may be fixed to the hangers 6, as FIG. 7 shows, or even confounded with the latter as in FIG. 8. As an alternative, the guideropes 11 may be directly fixed to the pipeline T as in FIGS. 9 to 12. They are heavy enough for retaining the pipeline in a calculated equilibrium condition.

Apart from their weighting function, the guideropes 11 develop because of their bulk laying on the seabed (see FIG. 12) an appreciable friction force which contributes to prevent the pipeline T from drifting under the influence of cross currents V.

In FIGS. 7 to 9, the length of the hangers 6 is so chosen that the distribution cable 5 remains permanently raised above the bed. This disposition however is not obligatory. In the case of cross currents in particular it may be contemplated to have the cable dragging along the sea bed as shown in FIGS. 10 and 12. In this case, the current V produces a transverse shifting, defined by an angle $\alpha$, between the pipeline T and the cable 5. Besides the guideropes 11 ensure then stability in the vertical equilibrium of the pipeline. Effectively if the angle $\alpha$ varies (for instance because of a variation of the thrust $F_x$ exerted by the cross current on the pipeline) the resulting vertical displacement of the pipeline is converted into a variation of the free length of the guideropes and thus with production of a vertical force $F_z$ which will have the effect of bringing the pipeline back to its initial level.

When the pipeline T is definitely in the wanted position the distribution cable 5 is of no great use. After a time and without inconvenience it may be severed by the displacements of the guideropes, if there are inversions of direction of the cross currents. As shown in FIG. 11, the cuts thus produced may even be beneficial if they are executed at points a, b, c, which are above hollows in the sea bed. The cable being dropped on the sea bed, a supplemental anchoring of the pipeline and relaxation of the vertical strains imparted to the pipeline by the hangers is obtained.

FIGS. 13 to 24 relate to slackening means acting as drags on the sea bed 7, which are more especially used in case laying of pipeline T has to be executed in zones traversed by appreciable cross currents.

A first embodiment of these slackening means is shown in FIGS. 13 to 15 in the form of anchor blocks 12 fixed at places to the distribution cable. They are pivotally mounted about this cable, every one of them having on top a rigid rod 13 (normally vertical) which is connected to the pipeline T by a hanger 6.

In a zone deprived of cross-currents, the anchor block 12 stands upright (see FIG. 14) because of the uplifting vertical force of pipeline T, which is amplified by the lever arm formed by rod 13, and glides over the bed on an under face 12a having a small friction coefficient with respect to the bed. In this configuration thus, because of the friction against the bed the block opposes only a relatively small resistance against the advance of cable 5 in its longitudinal direction.

When an important cross-current is present, it exerts a thrust on the pipeline, which causes the pivoting aside of the anchor block around cable 5 (see FIG. 15) through the intermediary of hanger 6 and rod 13. The block is then anchored on the sea bed by a lateral face 12b or 12c having a much greater friction coefficient than the friction coefficient of the under face 12a. With this configuration, the anchor block offers then a very high resistance against the drifting of cable 5 (and consequently of the pipeline) in its transverse direction. If pivoting occurs in the course of the laying of the pipeline, pulling on the cable 5 assists in releasing the anchor-blocks thereafter.

As it is seen in FIG. 15, every side face of the anchor block is provided with projections 14 which form as many anchoring noses. Similar teeth 15 may also be provided on the upper face 12d of said block.

FIGS. 16–17 show a modification in which the anchor block 12 takes its bearing on the bed 7 with the intermediary of a large footing 17, instead of standing upright on a narrow under face. This structure is to be preferred in the case of a loose bottom ground, for avoiding that the standing anchor block would penetrate deeply the sea bed. Besides such a footing will improve anchoring of the block when it swings as is shown in FIG. 17.

FIGS. 18 to 20 show another possible embodiment in which the anchor-block 12 is deprived from its upper rigid rod 13 and is pivotally mounted about the distribution cable 5 in such manner that its center of gravity G is situated lower than the cable.

The upper face 12d of this block has a concave configuration delimited by two cutting, longitudinal ridges 7, either of which being provided for engagement with the bed after pivoting of the block. As FIG. 18 shows, said ridges may have a scalloped profile with points or tips 17x which function as anchoring noses. From this figure there is also to be noticed that the fore end 12e of the block is shaped as a stem or prow so as to facilitate the advance of the block in the longitudinal direction. FIGS. 20 and 21 show this anchoring block during and at the end of its pivoting due to an initial drift of the distribution cable 5.

The slackening means shown in FIGS. 13–21 are particularly efficient on a relatively loose ground. For more consistent or harder grounds it is preferable to resort to means of another type, shown in FIGS. 22 to 24.

In FIG. 22, reference number 20 designates a "traveller" formed by a frame 21 which receives the distribution cable 5. Said cable extends across the traveller and is fixed to the frame 21 at the front and back thereof by clamping members 22. The frame 21 may also be connected to the pipeline T by a hanger 6. On the frame there are fitted horizontal revolving axes 24, perpendicular to the cable, which carry some rolling members 23 which rest on the sea-bed. The travellers 20 have a fixed orientation with respect to the cable 5, thus they can only run in the longitudinal direction of this cable, that is to say when hauling is performed. If there are any cross-currents, they are solicited in a direction parallel to the axes 24, so that the members 23 rub against the bed and their side faces act as abutments.

In the example shown in FIGS. 22 and 23, the rolling members 23 are rollers or balls made of concrete, which are equipped on their outer surface with a number of hard steel points 23a, capable of producing disintegration of a ground composed of such crumbly rocks (schistons shoals, soft limestones) as are often found in sea beds. Moreover said points assist in anchoring the travellers 20 against transverse drifting.

In the example shown in FIG. 24, the rolling members 23 are made of relatively thin wheels or disks having side flanges which play the part of abutments against transverse drifting.

When the hauling-laying operations are ended, that is to say when the front end of the pipeline has reached its destination, it is possible to cancel or not-according to case-the positive buoyancy of the pipeline.

If the initial buoyancy of the pipeline were relatively small, this cancellation may be automatically obtained by putting the pipeline in service, in particular if the latter is provided for transporting a liquid hydrocarbon. In other cases, it will be possible to suppress the positive buoyancy of the pipeline by releasing the floats or filling them with water. This operation is particularly easy to carry out in the case of such a pipeline as shown in FIG. 2, equipped with a continuous float that is initially filled with a fluid of small specific weight which may be replaced by water when wanted.

For choosing the definitive configuration of the pipeline one will have to take into account such factors as the depth of the sea bottom, the nature and irregularities of this bottom, the dangers of seisms, the existence of cross currents and the danger of constituting a possible obstacle against submarine navigation. In certain cases, especially for relatively shallow regions, it will be recommended to lay firmly the pipeline on the sea bed with a definitive configuration. This solution presents the advantage of improving pipeline anchorage against cross currents and to suppress the dangers of collisions in submarine navigation at the same time.

On the contrary, for deeper situated bottoms it may be contemplated to maintain permanently the pipeline under water at a sufficient height for avoiding any risk of the pipeline being squeezed by the surrounding water and also for it being outside the routes followed by modern submarines. The manifested configuration will be such as the one illustrated for instance in FIG. 6 or 13. By the way it will be remarked that the process of the invention permits easily of obtaining such a configuration, for it is quite convenient to use hangers 6 of very great length which extend from a distribution cable 5 situated near the bottom, when laying the pipeline.

With a definitive conformation, the anti-drift anchor blocks 12 which are shown in FIG. 13 continue to work efficiently even in the long run, that is to say even if the distribution cable 5 is destroyed by corrosion. As a matter of fact, said blocks are fixed not only to cable 5 (which is important when laying the pipeline) but also to the hangers 6 which may be made with practically non-deteriorating plastic material.

Modifications of the embodiments of the invention could be contemplated, within the scope of the appended claims.

I claim:

1. In a method of laying a pipeline on the bed of a body of water while forming the pipeline with a plurality of pipe sections initially stored ashore, comprising the steps of advancing a first one of said pipe sections towards the body of water, connecting a forward end of a second one of said pipe sections to a rear end of said first pipe section, further advancing said first and second pipe sections towards the water body, connecting a forward end of a third one of said pipe sections to a rear end of said second pipe sections, and so on, each advancing step comprising applying a hauling force to a pipeline portion of substantial length to haul the same towards the body of water, the improvement comprising distributing the hauling force into a plurality of traction forces, and applying the traction forces to respective points spaced along said pipeline portion.

2. Apparatus for hauling a buoyant pipeline in a body of water in order to lay the pipeline on the bed of the body of water, comprising a traction-force-distributing cable extending below and along the pipeline, a plurality of hangers respectively connecting a plurality of points spaced along the cable to respective locations spaced along the pipeline, weighting means connected to the cable for providing the pipeline, hangers and cable assembly with a negative buoyancy, and means for applying a hauling force to the cable.

3. Apparatus as claimed in claim 2, wherein said weighting means comprise a plurality of guide ropes, and means respectively attaching the guide ropes at respective locations spaced along said assembly, for the guide ropes to drag on the bed of the body of water.

4. Apparatus as claimed in claim 2, comprising a plurality of anti-drift devices, and connection means respectively attaching the devices at respective locations spaced along the distributing cable, each anti-drift device having a greater resistance to motion on said bed athwart the cable than lengthwise thereof.

5. Apparatus as claimed in claim 4, wherein said connection means attach each said device to one of said hangers.

6. Apparatus as claimed in claim 4, wherein said anti-drift devices comprise anchor-blocks each having a smooth underface for gliding longitudinally of the cable, and side surfaces with anchoring means projecting thereon, and means connecting the anchor-blocks to the cable for pivotal movement of the anchor-blocks athwart the cable.

7. Apparatus as claimed in claim 6, wherein said anchoring means comprise anchoring noses for anchorage in the bed of the body of water.

8. Apparatus as claimed in claim 6, wherein at least one of the anchor-blocks has a concave upper surface spaced from said underface and defining a sharp ridge with each of said side surfaces.

9. Apparatus as claimed in claim 8, wherein said sharp ridges have scalloped configurations.

10. Apparatus as claimed in claim 6, wherein at least one of the anchor-blocks has a rod upstanding at right angles to said underface, comprising means connecting the rod to one of said hangers.

11. Apparatus as claimed in claim 4, wherein said anti-drift devices comprise carriage assemblies each having a plurality of roller members having rolling surfaces for rolling on the bed of the body of water lengthwise of the cable.

12. Apparatus as claimed in claim 11, comprising a plurality of pointed protrusions projecting on said rolling surfaces.

13. Apparatus as claimed in claim 1, wherein said weighting means comprise a plurality of heavy elements spaced along the distributing cable.

14. Apparatus for hauling a buoyant pipeline in a body of water in order to lay the pipeline on the bed of the body of water, comprising an elongated member extending below and along the pipeline, a plurality of hangers respectively connecting a plurality of points spaced along the elongated member to respective locations spaced along the pipeline, the overall system including said pipeline, elongated member and hangers having a negative buoyancy, and means for applying a hauling force to the elongated member.

15. Apparatus as defined in claim 14, wherein said elongated member is rigid.

16. Apparatus as claimed in claim 15, wherein said rigid member is a metal rod.

17. Apparatus as claimed in claim 15, wherein said rigid member is a bar.

* * * * *